Jan. 1, 1957  L. R. MONTGOMERY  2,775,965
VETERINARIAN MOUTH SPECULUM

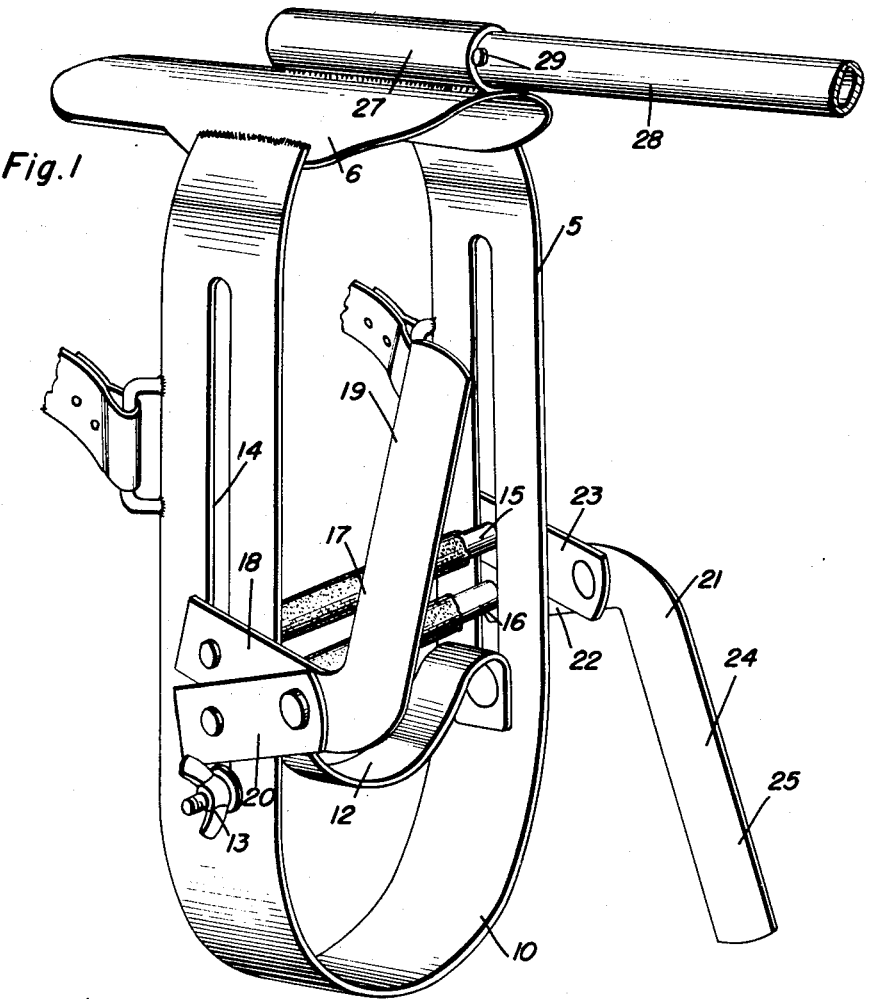
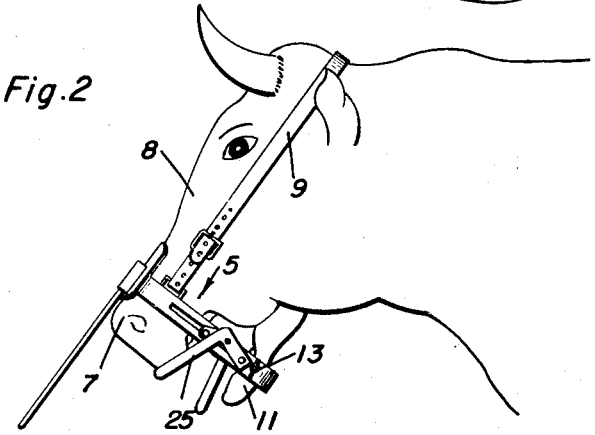

Filed July 12, 1954  2 Sheets-Sheet 2

Lancelot R. Montgomery
INVENTOR.

BY *Clarence A. O'Brien*
*and Harvey B. Jacobson*
Attorneys

United States Patent Office 2,775,965
Patented Jan. 1, 1957

2,775,965
VETERINARIAN MOUTH SPECULUM

Lancelot R. Montgomery, Casselton, N. Dak., assignor of one-half to L. Robert Montgomery, Casselton, N. Dak.

Application July 12, 1954, Serial No. 442,811

4 Claims. (Cl. 128—19)

The present invention relates to new and useful improvements in speculums for use in the examination of an animal's mouth or for the treatment of mouth diseases.

An important object of the invention is to provide upper and lower jaw spreading bars with actuating means at each end of the bars for subjecting the jaws at both sides of the mouth to uniform opening pressure.

Another object is to provide an elliptical frame adapted for attaching in position on top of the nose of the animal and under the lower jaw together with a vertically adjustable lower jaw support carried by the frame to accommodate animals of different sizes.

A further object of the invention is to provide a device of this character of simple and practical construction, which is efficient and reliable in operation, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout and in which:

Figure 1 is a perspective view;

Figure 2 is a side elevational view showing the speculum attached to an animal;

Figure 3:
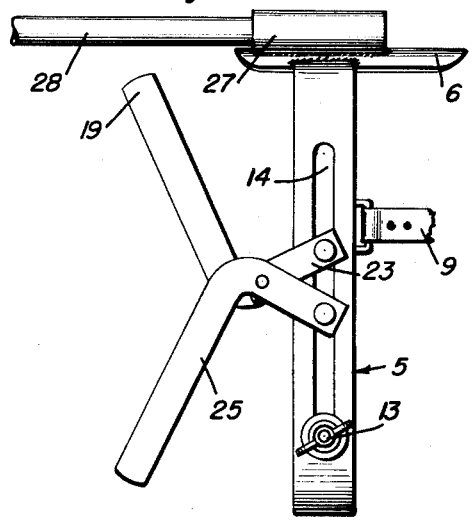
Figure 3 is a side elevational view showing the spreader bar actuating handles in position for placing the spreader bars in the mouth of an animal.
Figure 4:
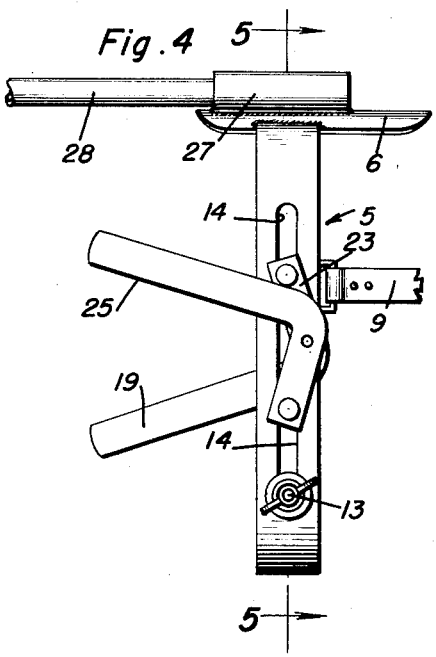
Figure 4 is a similar view with the handles in jaw spreading position.
Figure 5:
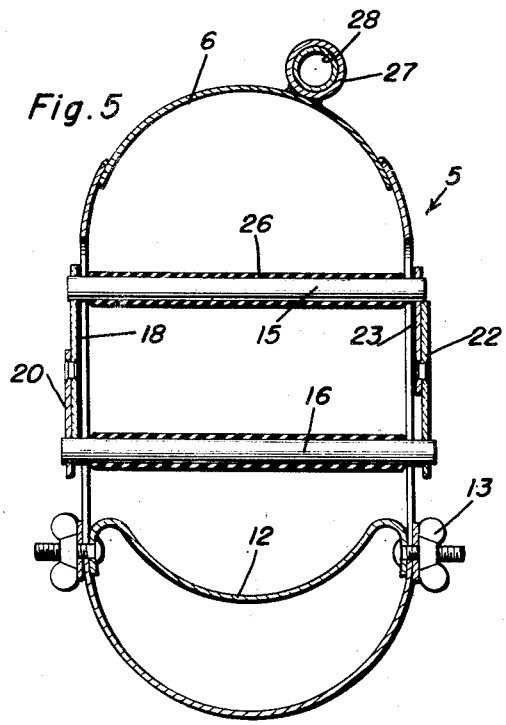
Figure 5 is an enlarged vertical sectional view taken on a line 5—5 of Figure 4.
Figure 6:
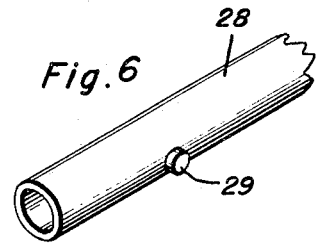
Figure 6 is a fragmentary enlarged perspective view of the animal controlling handle.

Referring now to the drawing in detail wherein for the purpose of illustration I have disclosed a preferred embodiment of my invention, the numeral 5 designates an elliptical frame having a saddle 6 at its upper end for resting on top of the nose 7 of an animal's head 8. A head strap 9 is attached to the sides of the frame for extending over the top of the head of the animal to secure the frame thereon.

The lower end 10 of the frame extends under the lower jaw 11 of the animal and an arcuate lower jaw support 12 is provided with bolts and wing nuts 13 at its end portions and positioned in vertical slots 14 in the sides of the frame to secure the support 12 in vertical adjusted position in the frame and under the lower jaw 11.

Upper and lower jaw spreading bars 15 and 16 are positioned in parallel relation to each other and are vertically slidable in the slots 14 above the lower jaw support 12. A bell-crank lever 17 has one arm 18 thereof pivoted to one end of the upper bar 15 at the outside of the frame, while the other arm 19 of the lever 17 extends upwardly to provide a handle. A link 20 is pivoted at one end of the central portion of lever 17 and the other end of the link is pivoted to the adjacent end of the lower spreader bar 16.

A second bell-crank lever 21 has one arm 22 pivoted to the other end of the lower spreader bar 16 at the opposite side of the frame from the lever 17, and a second link 23 is pivoted at one end to the central portion of lever 21 and the link is pivoted at its other end to the adjacent end of upper spreader bar 15. The other arm 24 of lever 21 extends downwardly to provide a second handle 25.

The spreader bars 15 and 16 are enclosed in a rubber tube or cover 26.

A tubular socket 27 is welded on top of the nose saddle 6 to receive a handle 28 which is slidably fitted in the socket and provided with a stop pin 29 to limit inward movement of the handle.

In the operation of the device, the handle 28 is used to manipulate the same when attaching the frame 5 on the head of the animal and while inserting the rods 15 and 16 in the mouth. The handle 28 also enables an attendant to hold the animal's head still while the veterinarian lowers handle 19 of lever 17 and handle 24 of lever 21 is raised to spread the rods 15 and 16 apart to open the jaws of the animal whereupon the mouth of the animal may be inspected and treated.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A mouth speculum comprising a frame adapted to embrace the nose and lower jaw of an animal, upper and lower horizontal spreader bars slidably carried by the frame and adapted to enter the mouth of the animal, a pair of levers pivoted to the respective spreader bars at opposite sides of the frame, and links connecting the levers to an opposing spreader bar to move the spreader bars toward or away from each other upon a swinging movement of the respective levers in opposite directions.

2. A mouth speculum comprising a frame adapted to embrace the nose and lower jaw of an animal, said frame having a vertical slot in each side, an upper spreader bar and a lower spreader bar slidable in said slots and adapted to enter the mouth of the animal, a pair of levers pivoted to the respective spreader bars, and links connecting the levers to an opposing spreader bar to move the rods toward or away from each other upon a swinging movement of the respective levers in opposite directions.

3. A mouth speculum comprising a frame adapted to embrace the nose and lower jaw of an animal, a vertically adjustable support carried by the frame and on which the lower jaw of the animal is supported, upper and lower jaw spreader bars slidably carried by the frame and adapted to enter the mouth of the animal, and individual levers connected to and oppositely actuating the spreader bars in a jaw opening movement.

4. A mouth speculum comprising a frame adapted to embrace the nose and lower jaw of an animal, a head strap attached to the frame, a handle attached to the top of the frame and extending forwardly beyond the nose of the animal for controlling movement of the head thereof, and upper and lower jaw opening means carried by the frame.

References Cited in the file of this patent

UNITED STATES PATENTS

| 803,418 | Hineman | Oct. 31, 1905 |
| 875,692 | Conkey | Jan. 7, 1908 |
| 1,022,068 | Dunn | Apr. 2, 1912 |